United States Patent [19]

Clark, Sr.

[11] 4,364,194

[45] Dec. 21, 1982

[54] ASSEMBLY FOR POISON BAITING RODENTS

[76] Inventor: Samuel K. Clark, Sr., Box 31A, Old Stage Rd., Glade Spring, Va. 23430

[21] Appl. No.: 171,918

[22] Filed: Jul. 24, 1980

Related U.S. Application Data

[63] Continuation-in-part of Ser. No. 952,884, Oct. 18, 1978, abandoned.

[51] Int. Cl.³ .................... A01M 25/00; A01M 1/20
[52] U.S. Cl. ........................................ 43/131; 43/121
[58] Field of Search ................... 43/131, 121, 124, 58

[56] References Cited

U.S. PATENT DOCUMENTS

| Re. 14,782 | 12/1919 | Hedrich et al. | 43/131 |
|---|---|---|---|
| 554,616 | 2/1896 | Cook | 43/121 |
| 1,000,368 | 8/1911 | Borkenhagen | 43/121 |
| 1,393,590 | 10/1921 | Vaden, Jr. | 43/131 |
| 1,633,982 | 6/1927 | Davis | 43/131 |
| 2,710,485 | 6/1955 | Starr | 43/131 |
| 3,965,609 | 6/1976 | Jordan | 43/131 |

FOREIGN PATENT DOCUMENTS

| 802772 | 2/1951 | Fed. Rep. of Germany | 43/131 |
|---|---|---|---|
| 1337380 | 4/1963 | France | 43/131 |
| 452269 | 5/1968 | Switzerland | 43/131 |
| 10401 | of 1884 | United Kingdom | 43/121 |

*Primary Examiner*—Roscoe V. Parker
*Attorney, Agent, or Firm*—Neil F. Markva

[57] ABSTRACT

The assembly for poison baiting rodents comprises a housing, an elongated hollow tubular element and a cover. The housing has an inner chamber that is sufficiently large to contain poison bait material. The elongated hollow tubular element has a coupling end and a length effective to fit the element inside the inner chamber of the housing when it is detached from the housing. The outer wall configuration includes an opening to receive the coupling end of the tubular element. The tubular element has a bore size sufficient to allow rodents to enter the inner chamber to feed on the poison bait while preventing larger animals from entering the inner chamber when the element is attached to the wall. The tubular element has a length sufficient to prevent animals other than rodents from gaining access to the inner chamber.

10 Claims, 10 Drawing Figures

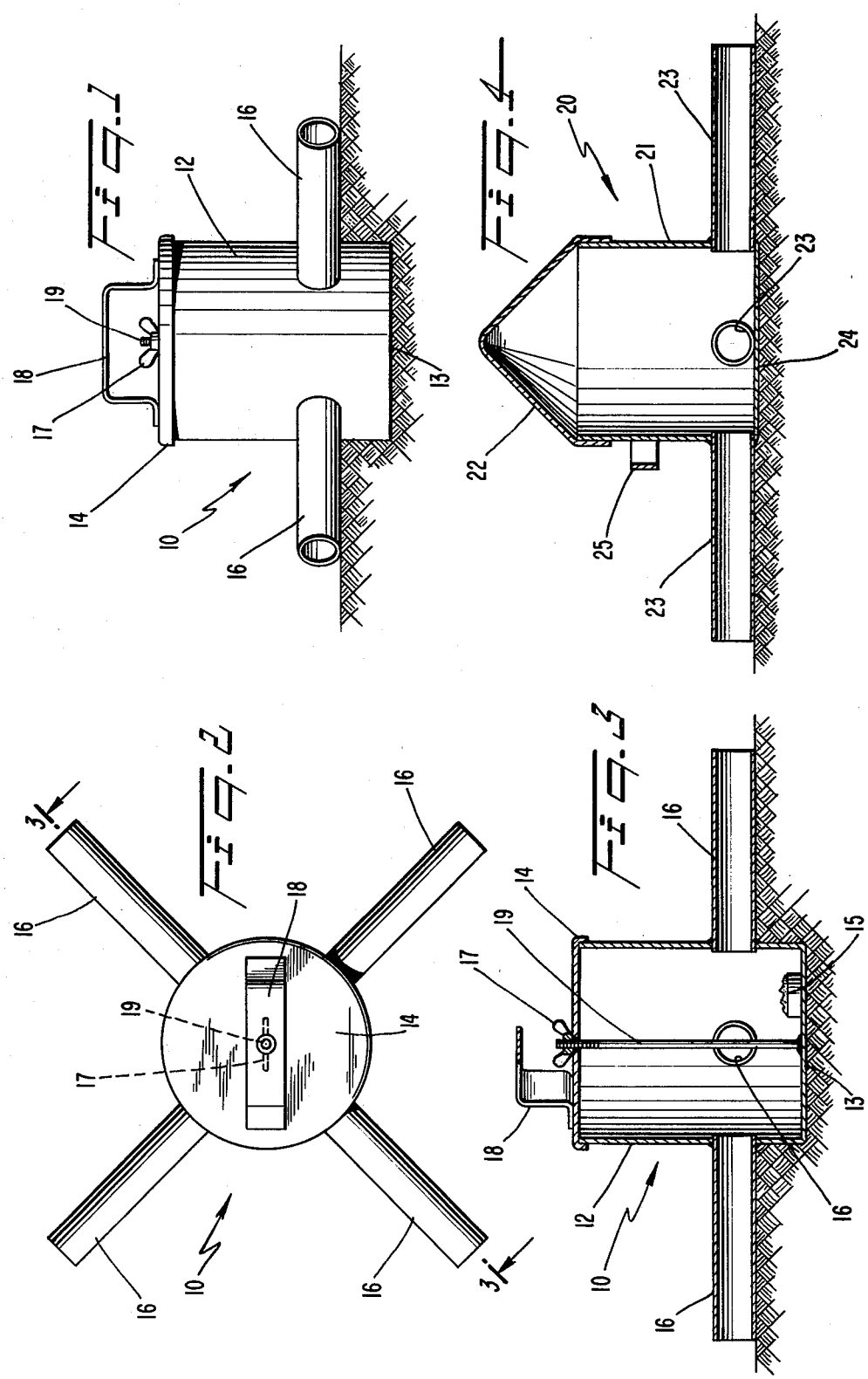

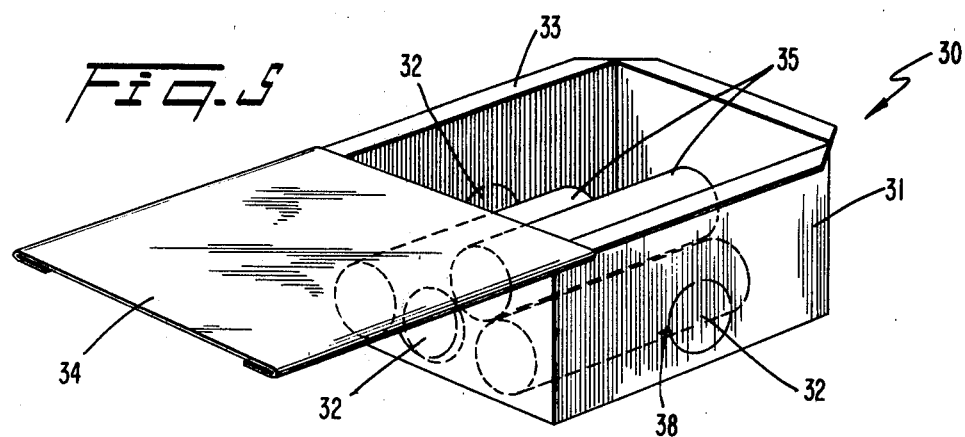
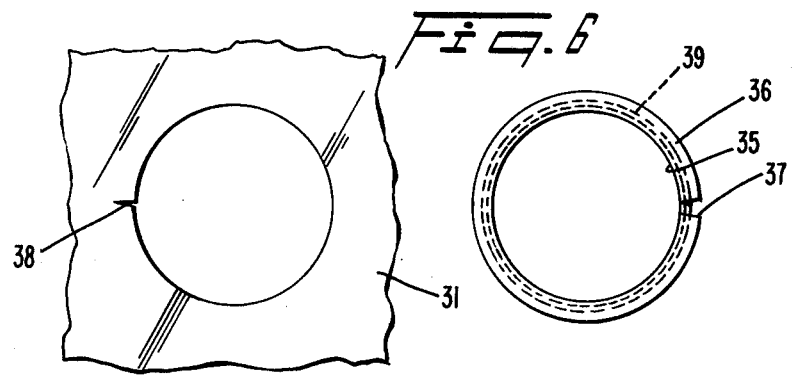
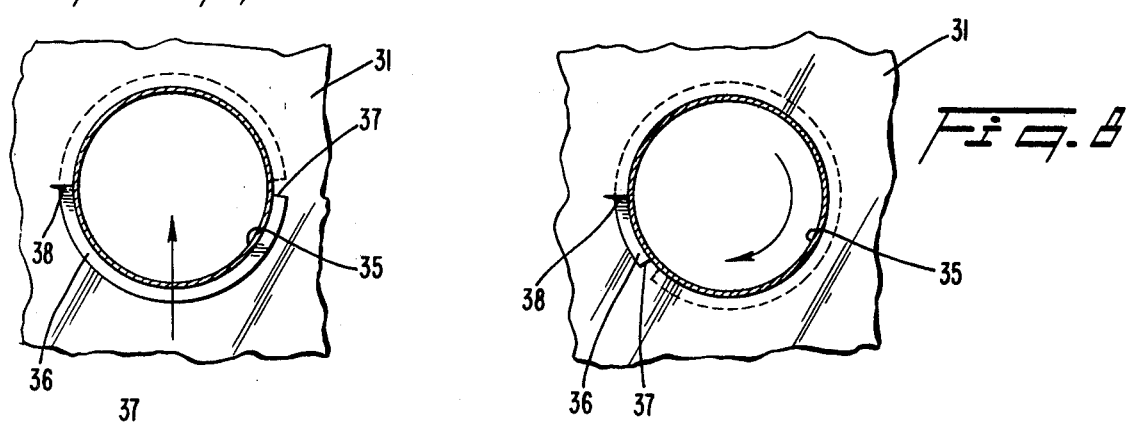
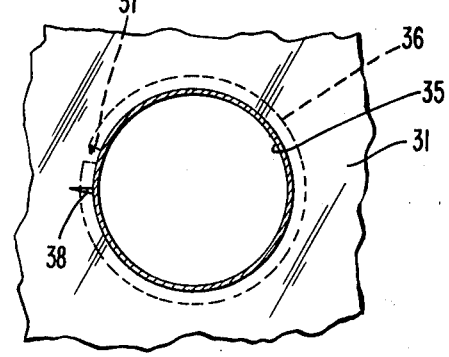
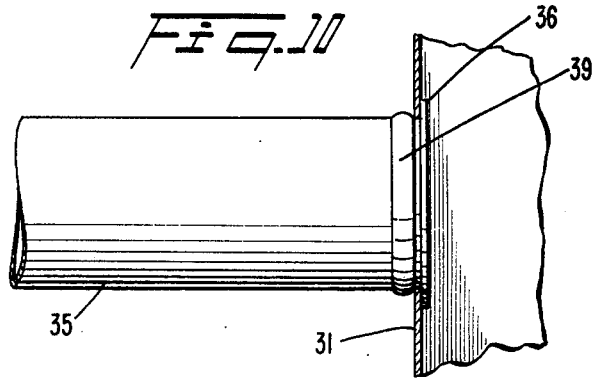

ASSEMBLY FOR POISON BAITING RODENTS

BACKGROUND OF THE INVENTION

This application is a continuation-in-part application of U.S. patent application Ser. No. 952,884 filed Oct. 18, 1978 now abandoned.

FIELD OF THE INVENTION

This invention relates to rodent poisoning devices in which poison bait material is placed for consumption by rodents.

Poison baiting devices or stations are well known in the prior art as exemplified by U.S. Patent No. Re. 14,782, U.S. Pat. No. 1,393,590, and No. 2,710,485. These prior art devices were designed to prevent the distribution or scattering of poisoned bait material where domestic animals might find it and eat it. A further intended function of these prior art devices is to guard against access to the poisoned bait material to anything other than undesirable small animals, such as rats, mice, and other rodents. These prior art devices are also supposed to prevent the poisoned bait material from absorbing moisture when placed either outdoors or in an otherwise highly humid atmosphere.

There are, however, disadvantages associated with the known prior art devices. The primary disadvantage is that the entire device may be tilted or turned over in such a manner as to render them completely ineffective. U.S. Pat. No. 1,393,590 describes a fairly specifically shaped poison container that must be disposed in a particular manner within the chamber of the housing so that the poison will be kept from contacting the walls of the housing itself. While the object of the specially shaped poison container is fulfilled, there is still no provision in this prior art device which would prevent the device from being turned over accidentally by the user or a larger animal. This prior art device also requires movable doors to be automatically closed if the device is upset. The disadvantage of maintenance of such a movable part over a long period of time is deemed obvious.

U.S. Pat. No. Re. 14,782 discloses a poison containing trap having two relatively elongated runways or tubular elements which open into the container and extend at right angles to the vertical axis of the container. The bottom of the container is bowl-shaped and is to be embedded into the ground so as to hold the device upright with the tubular runways resting on the ground. The patentee notes that one of the vital features is the extending of the bottom of the container below the level of the runways. It is further necessary to have a number of hook-shaped pegs to hold the poison baiting device firmly in place against accidental displacement. If pegs and hooks are not used, some other type of device must accomplish the same function. Clearly, this prior art device must be carefully placed and secured before it can be used.

The poison bait station in Pat. No. 2,710,485 is easily titled or tipped over by other larger animals. In other words, it is rendered ineffective for rodents moving into the device and taking poison out of the specially designed spaced poison baths therein. Further, poison located in the annular shaped bottom portion of this poison bait station would easily be spilled over the lip of each of the poison vats annularly disposed inside the poison bait station. Once spilled out of the container it becomes accessible to other animals.

PURPOSE OF THE INVENTION

The primary object of this invention is to provide a poison baiting device which is not necessarily dependent upon the manner in which it is disposed on a surface and cannot be tipped over accidentally causing spillage of the poison.

A further object of the invention is to provide a portable poison baiting assembly which may be placed on any type of surface without allowing access to other than small animals such as rats, mice, and other rodents.

A still further object of the invention is to provide a poison baiting device which does not require special fastening or holding mechanisms to secure the device in place where it is set for access by rodents.

Yet another object of the invention is to provide a poison baiting assembly having all the advantages of the prior art devices while overcoming any of the disadvantages associated with the known devices.

Another object of the invention is to provide an assembly which may be easily transported and assembled on site to fix the tubular elements in a permanent position on the housing wall of the device.

A further object of the invention is to provide a device which may be readily adapted to any type of location such as in corners where only a portion of the tubular elements are required to be placed.

SUMMARY OF THE INVENTION

The assembly for poison baiting rodents comprises a housing having a plurality of elongated hollow runways or tubular elements extending outwardly therefrom and opening into an inner chamber within the housing. The inner chamber is sufficiently large to contain the poison bait material. The hollow runways have a bore size sufficient to allow rodents to enter the inner chamber to feed on the poison bait material while preventing larger animals from entering therein. A sufficient number of the hollow runways are peripherally spaced a distance with respect to each other around the housing and have sufficient length to be effective to maintain the device in an upright position. The length of the tubular elements is sufficient to prevent animals other than rodents from gaining access to the inner chamber.

Another feature of the invention is directed to the structure of the housing having a removably mounted cover means which affords access to the inner chamber when it is removed. Fastening means may be used to secure the cover to the housing. A novel flange and edge structure is at the top of the wall and cover means. A handle mechanism is connected to the housing to facilitate the portability of the device. The use of knockouts for openings and the means for connecting the detached tubular elements to the openings are additional features of the invention.

A further feature of the invention is a housing having a substantially planar bottom with the lowermost surface of each runway being substantially co-extensive with the planar bottom. In a specific embodiment of the invention, the runways or tubular elements are equally spaced with respect to each other along the periphery of the housing. When the housing is cylindrically shaped, there are at least three runways equally spaced with respect to each other along the circumference of the housing.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is an elevational view of an assembly made in accordance with this invention as shown disposed with a portion thereof buried in the surface of the material on which it is placed;

FIG. 2 is a top plan view of the assembly of FIG. 1;

FIG. 3 is a cross-sectional view of the assembly of FIG. 1;

FIG. 4 is a further embodiment of an assembly made in accordance with this invention;

FIG. 5 is a perspective view of another embodiment of an assembly made in accordance with this invention shown with the cover member partially removed;

FIG. 6 is a fragmentary view of the coupling end of the tubular element and opening in the outer wall configuration of the assembly;

FIGS. 7 through 9 show the mechanism for permanently affixing the tubular element onto the assembly, and FIG. 10 shows a fragmentary sectional view with the tubular element permanently affixed to the outer wall configuration.

DETAILED DESCRIPTION

As shown in FIG. 1, a poison baiting assembly, generally designated 10, comprises a housing 12 having a flat bottom 13 and a removable lid 14 disposed thereon. A plurality of hollow, tubular runways or elements 16 extend outwardly from the housing 12 and open into the inner chamber within the housing 12. The inner chamber is sufficiently large to contain poison bait material located in a container 15 disposed on the bottom 13. In this embodiment, the inner chamber has a bottom portion 13 which is at a spaced distance from the runway 16 as shown. Thus, it is possible for the downwardly extended portion of the container under the housing 12 to be placed in a depression in the ground.

There are four tubular elements 16 projecting outwardly from housing 12 and they are equally spaced with respect to each other along the circumference of the cylindrically shaped housing 12. Thus, there is a sufficient number of hollow elements 16 spaced with respect to each other around housing 12 and have a sufficient length to be effective to maintain the assembly 10 in an upright position. In this specific embodiment, the cylindrically shaped housing has a diameter of about 10.5 inches and the runways 16 extend outwardly from the housing 12 by about nine inches. Each of the elements 16 are substantially equal in length with respect to each other.

A fastening assembly including a threaded rod 19 and a wing nut 17 are used to secure the cover member 14 to the housing 12. A handle 18 is shown connected to the housing 12 via cover 14 to facilitate the portability of the assembly 10.

In the embodiment of the device shown in FIG. 4, the assembly 20 includes a housing 21 with a plurality of runways 23 extending outwardly therefrom. The cover 22 is sealed and tapered to keep material such as snow from adhering to it. Handle 25 is used to facilitate carrying. Elements 23 are equally spaced with respect to each other along the periphery of housing 21 which has a substantially planar bottom 24. The lowermost surface of each runway 23 is substantially co-extensive with the planar bottom 24 and is clearly shown in FIG. 4. Thus, this embodiment may be placed at any location on a surface. The poison may be held in an area within the container which will not obstruct the view through the runways 16 and 23 as shown herein. The runways or tubular elements 16 and 23 have a tubular shape with a diameter of about 2½ inches.

Assembly 30 as shown in FIG. 5 has a plurality of tubular elements 35 with a link sufficient to fit within the inner chamber defined by the outer wall configuration 31 as shown. The outer wall 31 includes outwardly projecting flange portions 33 located at the top thereof. The outer edge portion of the cover 34 is doubled over to receive and slidingly engage the outwardly projecting flange portions 33. Fastening means may be used to secure the cover 34 in a closed position in contact with the flange portions 33. The outer wall configuration 31 includes a plurality of flat planar sections including removable knock-out portions 32 which must be removed to form an opening in the flat planar sections of the wall 31 as shown.

With references to FIGS. 6 through 10, once the knock-out portions 32 are removed, the single slit 38 is exposed and extends in a direction outwardly from the periphery of the opening and for a distance equal to at least the width of the circumferential flange 36 located around the tubular element 35. A slot 37 extends transversely across the flange 36. To insert the flange into the opening, the tubular element 35 is moved upwardly with the upper portion of the flange 36 extending on one side of the wall 31 and the lower portion of the flange 36 disposed on the inside of the wall. This is effected by placing the edge of the opening into the slot 37 and the flange 36 into the slit 38 as shown. The tubular element 32 is then turned clockwise as indicated by the arrow in FIG. 8 until the slot 37 passes the location of the slit 38, thereby effecting the disposition of the flange 36 on the inside of the wall 31 as shown in FIG. 10. The raised portion 39 constitutes a coupling abutment means which is longitudinally spaced inwardly from the circumferential flange 36. This raised portion 39 maintains the disposition of the element 31 in place with the flange 36 snugly fit against the inside edge of the opening as shown in FIG. 10.

The term "runway" is an art-recognized term meaning a tunnel formed by an elongated hollow tubular element extending outwardly from a housing having an inner chamber. A hollow tubular body aptly named in the prior art as a runway opens into the inner chamber of the housing. This does not include the type of opening as shown in the Swiss Pat. No. 452,269 and designated by numerals 5 and 17. It is clear that this prior art structure does not have a length effective to prevent animals other than rodents from gaining access to the inside of the chamber with their paw or their tongues. This is only effective when the tubes are of the length shown herein. A further function of the elongated elements 16, 23 and 35 is to maintain the device in an upright position without the necessity for means to fix the elongated elements to the surface on which the device is disposed. This is particularly true where the device is used in a location that is set apart from any wall configuration. With the knock-out portions 32 as shown in the embodiment of FIG. 5, the assembly is shown to be a clear improvement over such arrangements as disclosed in the German Pat. No. 802,772 and the U.S. Pat. No. 3,965,609.

ADVANTAGES OF THE INVENTION

There is no requirement for any specially shaped poison holder on chamber bottom portion as shown in the prior art. The assembly, made in accordance with this invention, may be placed at any location with little possibility of it being turned over or otherwise tilted to spill the poisoned contents. Commercially available bait chemically acts to cause the rodents to crave water. The rodents enter the device, eat the bait, and then leave the device. Consequently the assembly may be used in any one place for as long as it is required simply by replacing the supply of poison baiting material. The device can be placed anywhere desired without any concern for animals such as chickens, cats, dogs, pigs and other domestic animals gaining access to the poison. This is true even though there is no requirement for any specially shaped fastening mechanism to hold the assembly fixed to the surface on which it is located.

While the assembly for poison baiting rodents has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. In an assembly for poison baiting rodents, said assembly including a housing and a plurality of elongated tubular elements having an inlet, and outlet and a bore size sufficient to allow rodents to enter and exit from the inside of the housing and the tubular elements having a sufficient length to prevent animals other than rodents from gaining access to the inside of the housing, the improvement comprising:
    (a) the housing having an outer wall configuration including a plurality of flat planar sections with opening means in each said planar section,
    (b) an elongated tubular element for each of the opening means in said housing,
    (c) said housing defines an inner chamber sufficiently large to contain the total plurality of elongated tubular elements before said tubular elements are attached to said opening means,
    (d) each said tubular element including coupling means at one end thereof for fixedly connecting the tubular element to the opening means to extend outwardly from the opening means in the outer wall configuration,
    (e) said opening means being spaced around the outer periphery of the housing to attach the tubular elements at locations to maintain the device in an upright position without the necessity for a means to fix the elongated elements to the surface on which the assembly is disposed.
2. The improvement as defined in claim 1 wherein each elongated tubular element has a circumferential flange having a slot extending transversely thereacross,
    each opening means includes a circular opening and includes a single slit extending in a direction outwardly from the periphery of the opening and for a distance equal to at least the width of said circumferential flange.
3. The improvement as defined in claim 2 wherein a coupling abutment means is longitudinally spaced inwardly from the circumferential flange.
4. The improvement as defined in claim 1 wherein the housing has a substantially planar bottom and the outer wall configuration defines an inner chamber having a rectangular cross-section.
5. The improvement as defined in claim 1 wherein the inner chamber has a bottom portion which is at a spaced distance from the tubular elements which open into said chamber.
6. The improvement as defined in claim 1 wherein the housing has a substantially planar bottom and the lowermost surface of each tubular element is substantially coextensive with said planar bottom.
7. The improvement as defined in any one of the claims 1, 2, 3, 4, 5 or 6 wherein
    the housing includes a removably mounted cover means disposed on an upwardly directed outer wall configuration.
8. The improvement as defined in claim 7 wherein the outer wall configuration includes outwardly projecting flange portions located at the top edge thereof, and
    the cover means includes an outer edge portion that slidingly engages said outer projecting flange portions.
9. The improvement as defined in claim 7 wherein each opening means includes a removable knock-out portion which must be removed to form an opening.
10. The improvement as defined in claim 7 wherein said opening means are equally spaced within respect to each other along the periphery of the housing.

* * * * *